United States Patent
Leblond et al.

(10) Patent No.: US 9,021,856 B2
(45) Date of Patent: May 5, 2015

(54) DEVICE FOR CHECKING A FLOW PRESSURE MEASUREMENT PROBE, AND PROBE COMPRISING THE DEVICE

(75) Inventors: Henri Leblond, Versailles (FR); Philippe Guichard, Chabeuil (FR); Jean-Philippe Pineau, Landes le Gaulois (FR)

(73) Assignee: Thales, Neuilly sur Seine (FR)

( * ) Notice: Subject to any disclaimer, the term of this patent is extended or adjusted under 35 U.S.C. 154(b) by 897 days.

(21) Appl. No.: 13/103,330

(22) Filed: May 9, 2011

(65) Prior Publication Data

US 2012/0118037 A1    May 17, 2012

(30) Foreign Application Priority Data

May 7, 2010   (FR) .................................... 10 01970

(51) Int. Cl.
| | |
|---|---|
| G01P 21/00 | (2006.01) |
| G01F 25/00 | (2006.01) |
| G01L 27/00 | (2006.01) |
| G01P 5/16 | (2006.01) |
| G01P 21/02 | (2006.01) |

(52) U.S. Cl.
CPC ................. *G01P 21/025* (2013.01); *G01P 5/16* (2013.01)

(58) Field of Classification Search
CPC ........ G01L 27/007; G01P 5/16; G01P 21/025
USPC ............. 73/1.25–1.26, 1.29, 1.34–1.35, 1.59, 73/1.63–1.64, 178, 1.82, 170.02, 170.14, 73/180, 182, 579, 602, 618–620, 624, 627, 73/629, 861.65
See application file for complete search history.

(56) References Cited

U.S. PATENT DOCUMENTS

| | | | | |
|---|---|---|---|---|
| 5,001,638 | A | * | 3/1991 | Zimmerman et al. .......... 701/14 |
| 5,257,536 | A | | 11/1993 | Beigbeder et al. |
| 5,331,967 | A | * | 7/1994 | Akerson ....................... 600/529 |
| 5,358,029 | A | * | 10/1994 | Baveja et al. ................. 164/516 |
| 5,567,863 | A | | 10/1996 | Larson et al. |
| 5,601,254 | A | * | 2/1997 | Ortiz et al. ................... 73/180 X |
| 5,684,756 | A | * | 11/1997 | Schmitz et al. ............... 367/188 |
| 6,654,697 | B1 | * | 11/2003 | Eryurek et al. ............ 73/1.35 X |
| 7,036,365 | B2 | | 5/2006 | Choisnet |

(Continued)

FOREIGN PATENT DOCUMENTS

| | | |
|---|---|---|
| CN | 1137827 A | 12/1996 |
| CN | 1846135 A | 10/2006 |

(Continued)

*Primary Examiner* — Thomas P Noland
(74) *Attorney, Agent, or Firm* — Baker and Hostetler LLP

(57) ABSTRACT

A device is provided for checking a flow pressure measurement probe as well as a probe comprising the device. The probe includes an internal volume and at least one orifice for communication with the outside of the volume. The device includes: an acoustic transmitter and an acoustic receiver that are intended to be connected to the internal volume so that the transmitter transmits an acoustic signal that propagates in the internal volume and so that the receiver picks up an observed acoustic signal; and, means for comparing the observed signal with a reference signal. The device may be a stand-alone device or may be integrated into the probe.

10 Claims, 2 Drawing Sheets

(56) References Cited

U.S. PATENT DOCUMENTS

| | | | |
|---|---|---|---|
| 7,523,667 B2 * | 4/2009 | Brown et al. ................... 73/592 |
| 7,533,571 B2 * | 5/2009 | Ariav et al. ................ 73/602 X |
| 8,434,358 B2 * | 5/2013 | Asahara et al. ............ 73/170.02 |
| 8,601,883 B2 * | 12/2013 | Strom .................... 73/861.65 X |
| 8,726,746 B2 * | 5/2014 | Wassermeier et al. .. G01F 25/00 |
| 2001/0029785 A1 * | 10/2001 | Heaslip et al. ................. 73/579 |
| 2004/0255665 A1 | 12/2004 | Choisnet |
| 2007/0280046 A1 | 12/2007 | Perez |
| 2008/0149151 A1 * | 6/2008 | Guichard ................... 134/58 R |
| 2011/0308299 A1 * | 12/2011 | Tabaru .............................. 73/37 |
| 2013/0247686 A1 * | 9/2013 | Watkins et al. ............ 73/861.65 |

FOREIGN PATENT DOCUMENTS

| | | | | |
|---|---|---|---|---|
| EP | 2 273 275 A1 | | 1/2011 | |
| FR | 2 665 539 A1 | | 2/1992 | |
| FR | 2 823 846 A1 | | 10/2002 | |
| FR | 2 910 357 A1 | | 6/2008 | |
| GB | 2032118 A | * | 4/1980 | ................ 73/861.65 |
| GB | 2039676 A | * | 8/1980 | ...................... 73/180 |
| GB | 2191860 A | * | 12/1987 | ...................... 73/605 |
| GB | 2478522 B | * | 10/2013 | ............ G01P 21/025 |
| JP | 51148478 A | * | 12/1976 | ............. G01L 27/00 |
| WO | WO 03048713 A1 | * | 6/2003 | ............. G01M 3/24 |
| WO | WO 2010101193 A1 | * | 9/2010 | ............. G01L 27/00 |

* cited by examiner

DEVICE FOR CHECKING A FLOW PRESSURE MEASUREMENT PROBE, AND PROBE COMPRISING THE DEVICE

CROSS-REFERENCE TO RELATED APPLICATION

This application claims priority to foreign French patent application No. FR 1001970, filed on May 7, 2010, the disclosure of which is incorporated by reference in its entirety.

FIELD OF THE INVENTION

The invention relates to a device for checking a flow pressure measurement probe and to a probe comprising the device.

BACKGROUND

The pilot of any aircraft needs to know its relative velocity in relation to the air, i.e. in relation to the wind. This velocity is determined using probes for measuring the static pressure Ps and the total pressure Pt, and also sensors for measuring the angle of attack α and the angle of sideslip β. α and β provide the direction of the velocity vector in a reference system, or reference frame, associated with the aircraft and Pt-Ps provides the modulus of this velocity vector. The four aerodynamic parameters therefore enable the velocity vector of any aircraft, such as for example an aeroplane or a helicopter, to be determined.

The measurement of the total pressure Pt is usually performed using what is called a Pitot tube. This is a tube open at one of its ends and obstructed at the other. The open end of the tube substantially faces the flow.

The airstream located upstream of the tube is progressively slowed down until reaching an almost zero velocity at the inlet of the tube. The pressure of the air increases as the velocity of the air decreases. This increased pressure forms the total pressure Pt of the air flow. Inside the Pitot tube, the air pressure obtaining therein is measured.

In practice, the air flow may convey solid or liquid particles, such as for example water from clouds, which are liable to penetrate into the Pitot tube and accumulate in the tube at the obstructed end. To prevent such an accumulation from disturbing the pressure measurement, the obstructed end is generally provided with one or more drain holes and with water traps, so as to avoid any risk of obstructing the lines responsible for transmitting the total pressure to the pressure sensors located inside the fuselage of the aircraft or to the instruments on the instrument panel of the aircraft.

The drain holes serve to remove liquids and possible particles that may penetrate into the tube. These holes are particularly useful in the case of flight in a water-laden atmosphere, where the water is in the liquid state (which may be super cooled) or is in the solid state that can arise in case of icing conditions.

Flowing simultaneously through such a hole are water, particles and a portion of the air entering the Pitot tube. Thus, the air in the tube is not completely slowed down and the measurement of the total pressure Pt is thereby slightly altered. More precisely, the more it is endeavoured to prevent significant accumulation of water or particles, by increasing the size of the drain hole, the more the measurement of the total pressure is altered. Conversely, the more it is endeavoured to improve the measurement of the total pressure Pt, by reducing the size of the drain hole, the greater the risk of water or particles accumulating. With a Pitot tube, it is therefore necessary to make a compromise between the quality of the measurement of the total pressure Pt and the risk of disturbing the measurement because of the penetration of water and particles conveyed by the air flow where the measurement is carried out. It is therefore not possible for the size of the drain holes to be greatly increased in order to improve their effectiveness.

Over the operational lifetime of aircraft, the drain holes become contaminated, because of ingestion of dust, insects, residues of plant matter or other foreign bodies. Because of their size and the position of the Pitot tubes on the fuselage of an aircraft, it is not very easy for the integrity of the drain holes to be periodically checked. There is no provision to verify these holes before each flight and in-flight checking is impossible. This may have an impact on flight safety.

The drain holes of Pitot tubes are currently checked visually. The operator responsible for aircraft maintenance inspects the drain hole or holes using a small lamp. Should foreign bodies or an anomaly be observed, the probe is removed and its pneumatic circuits cleaned. This operation is all the more awkward the larger the aeroplane. Access to the probe and to the drain holes, which generally have a diameter of less than 1 mm, is difficult. Therefore, the operation is carried out only rarely. It is frequently the case that the checking periodicity is more than one year.

Of course, such time intervals are not acceptable for aeroplanes flying over countries where the atmosphere is highly polluted, when there are sandstorms or volcanic clouds, or more simply in regions where the presence of nest-building insects, such as mason bees, is high.

It frequently happens that aeroplane pilots report problems of velocity measurement fluctuation during flights that have encountered strong precipitation.

Solutions have been proposed for reducing the impact of the drawbacks associated with drain holes.

Mention may be made of pressure probes in which the operating principle makes it possible to provide a drain circuit of large cross section, as described for example in the patent published under No. FR 2 823 846 and filed on 24 Apr. 2001. This is a probe for measuring the total pressure at a fluid stagnation point. More precisely, this probe takes at least two airstreams from an air flow and brings them into contact with each other so as to slow them down. The pressure in the zone where the air is slowed down is measured and this measured pressure gives the total pressure of the flow. Such a probe makes it possible for the dimensions of the drain holes to be considerably increased. However, this solution has the drawback of significantly affecting the design and the intrinsic failure modes of the pressure probe function, and therefore of requiring a much longer time to be certified and to be installed in volume on aircraft in service.

Moreover, the measurement of the static pressure can be made using a probe flush with the skin of the aircraft and possessing a duct opening substantially perpendicular to the direction of the flow, inside which duct the pressure of the air is measured.

It may happen that certain impurities are deposited on internal walls of the duct. Over the course of time, the deposited impurities create clumps of impurities that are attached to the internal walls and may disturb the flow of the fluid in the duct by modifying its geometry. Impurity deposits and clump formation are encountered quite frequently when the fluid flow rate in the duct is not sufficient to displace deposited impurities. The deposits are caused either by impurities adhering to the internal walls of ducts or by the accumulation of impurities due to microturbulence in calm fluid flow zones.

Should the air inlet ducts of such a probe be partially obstructed, it is the response time of the probe which is affected. Should there be total obstruction, the static pressure measurement itself is false. For such a probe, a self-cleaning device has been developed for cleaning the internal walls, as described in patent No. FR 2 910 357 filed on 20 Dec. 2006. The object of this device is to warn of, and to a certain extent eliminate, the blockage phenomenon. These probes make it possible to use the principle whereby the motional impedance of the driving element is modified so as to detect a partial or complete blockage of the duct in question. However, they have the drawback of testing only the internal volumes that are equipped with the deblocking device; for example, if only the drain holes are equipped therewith, no blockage of the nose of the probe via which the flow of air penetrates the probe is detected.

SUMMARY OF THE INVENTION

The present invention alleviates all or some of the above-mentioned problems by automatically or semi-automatically checking for the non-obstruction of the internal cavities and drain holes of existing pressure probes, notably static pressure probes, Pitot tubes, pitot-static probes and partially or completely pneumatic angle-of-attack probes. The invention allows checking during periodic maintenance operations, during pre-flight checks, or even in real time in flight.

The present invention further provides a device for checking a flow pressure measurement probe, the probe comprising an internal volume and at least one orifice for communication with the outside of the volume, characterized in that it comprises:
  an acoustic transmitter and an acoustic receiver that are intended to be connected to the internal volume so that the transmitter transmits an acoustic signal that propagates in the internal volume and so that the receiver picks up an acoustic signal observed in the internal volume; and
  means for comparing the acoustic signal observed in the internal volume with a reference acoustic signal.

In a preferred embodiment, the connection of the acoustic transmitter and the acoustic receiver to the internal volume is made temporarily. In other words, the device is a checking tool that can be installed on existing probes.

Another subject of the invention is a flow pressure measurement probe, the probe comprising an internal volume and at least one orifice for communication with the external environment, characterized in that it comprises a checking device according to the invention. In other words, the device may be a stand-alone device or may be integrated into the probe.

The checking device or the probe equipped with the device enables the entire pneumatic circuit, of which the internal volume of the probe forms part, to be checked. Specifically, if the internal volume of the probe is connected by means of a pneumatic connector to other instruments on the aircraft, such as for example an ADC (Air Data Computer), the acoustic signal then propagates as far as these instruments. Any anomaly in the pneumatic circuit can be detected by the checking device.

A stand-alone device may be employed for any existing type of probe. An integrated device makes it possible to carry out an operation of checking the probe without requiring direct intervention in the vicinity of the probe. It is possible to control the transmitter remotely and to relay the result of the comparison between the observed acoustic signal received by the receiver and the reference signal. Such a checking operation may even be carried out during a flight of an aircraft equipped with the probe. It is simply a case of taking into account the atmospheric pressure and the temperature of the flow, so as possibly to adapt the measurement device to this pressure and this temperature.

BRIEF DESCRIPTION OF THE DRAWINGS

The invention will be more clearly understood and other advantages will become apparent on reading the detailed description of an embodiment given by way of example, this description being illustrated by the appended drawing in which.

For the sake of clarity, identical elements will bear the same references in the various figures.

DETAILED DESCRIPTION

The invention is described in relation to a total pressure measurement probe. Of course, it is possible to install it for a static pressure measurement probe, for a pitot-static probe or for a completely or partially pneumatic angle-of-attack probe.

Figure 1:
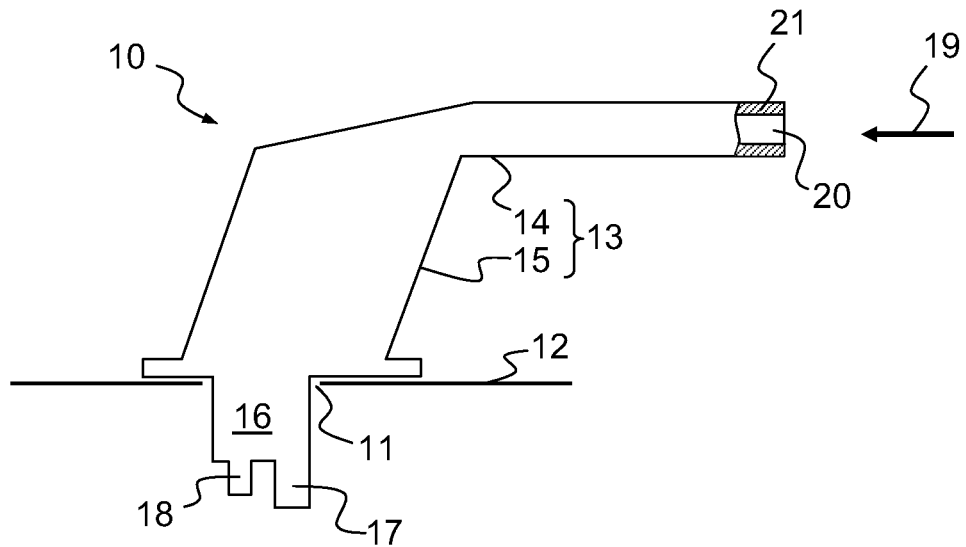
FIG. 1 shows a total pressure measurement probe.

FIG. 1 shows a total pressure measurement probe 10 intended to be fastened to and passing through an opening 11 made in the skin 12 of an aircraft. The probe 10 comprises an external part 13 outside the skin 12 and formed by a Pitot tube 14 supported by a mast 15. The probe 10 also comprises an internal part 16 essentially consisting of an electrical connector 17 and a pneumatic connector 18. The connector 17 enables the probe 10 to be electrically connected to the aircraft, notably for connecting heating means for deicing the probe 10. These deicing means comprise, for example, a heating resistor surrounding notably the Pitot tube 14 and enabling the aircraft to fly in an environment in which icing is liable to occur. The connector 18 enables the Pitot tube 14 to be pneumatically connected to a pressure sensor or another measurement device, located inside the fuselage under the skin 12 of the aircraft. The probe 10 is positioned on the skin 12 of the aircraft in such a way that the pitot tube 14 is oriented substantially along a longitudinal axis of the aircraft, away from the boundary layer, in order for the direction of the flow, depicted by an arrow 19, to substantially face an inlet orifice 20 located at a first end 21 of the Pitot tube 14.

In the example shown, the Pitot tube 14 is fixed in relation to the skin 12 of the aircraft. Of course, it is possible to mount the Pitot tube 14 on a movable mast, such as for example a vane that can orient along the axis of the flow such as, for example, described in the patent published under No. FR 2 665 539 and filed on 3 Aug. 1990. Thus, when the local angle of attack of the flow in the vicinity of the probe 10 changes, the orientation of the Pitot tube 14 follows this angle of attack so as always to face the flow. The total pressure measurement is accordingly improved when the local angle of attack varies.

Figure 2:
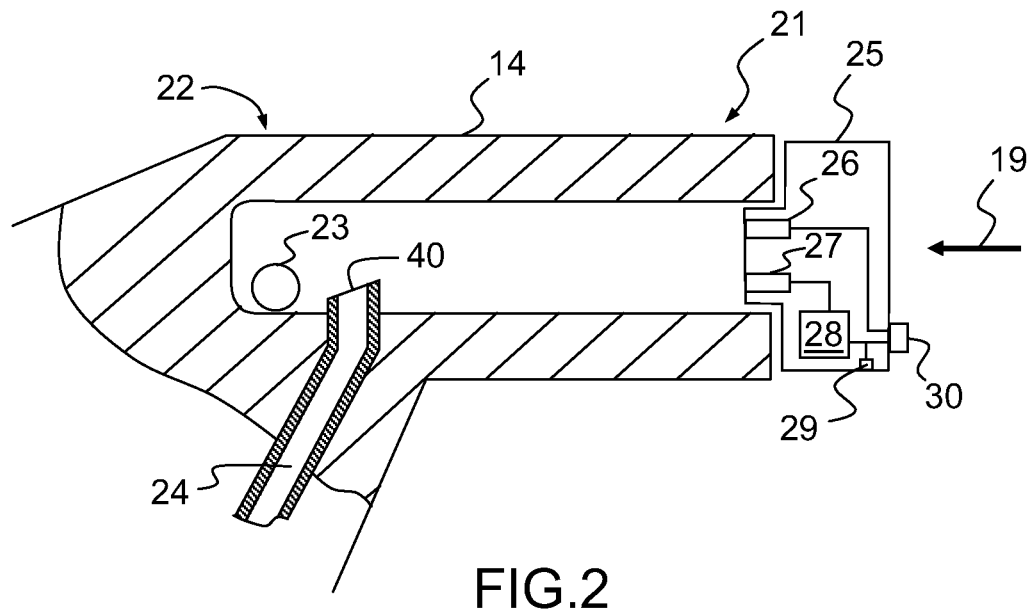
FIG. 2 shows a partial view of the probe of FIG. 1 in the vicinity of which a checking device according to the invention is placed.

FIG. 2 shows in greater detail the Pitot tube 14 forming that part of the probe furthest away from the skin 12 of the aircraft. The means for measuring the total pressure comprise a first tube 14, advantageously of circular cross section, called the Pitot tube, which is oriented substantially along the axis 19 of the air flow. At the end 22 of the tube 14, the end 22 being opposite the end 21, the tube 14 has a drain hole 23 enabling particles liable to penetrate inside the tube 14 to be removed. Again at the end 22 of the tube, a pneumatic channel 24 opens into the tube 14 in order to form therein a pressure tap 40 at which it is desired to measure the air pressure. The pressure tap 40 is generally constructed so as to prevent the ingestion of water into the tube 14 and thus form a water trap. The channel 24 is for example connected to a pressure sensor not shown in FIG. 2. The pressure sensor serves for effectively measuring the pressure of the air obtaining inside the tube 14 at its end 22. The pressure sensor may belong to the probe or it may be away from it. In this case, the pressure sensor is connected to the probe 31 by means of the pneumatic connector 18. Except for the drain hole 23, the cross section of which is small compared to that of the tube 14, the tube 14 is closed at its end 22. The pressure measured at this end therefore represents the total pressure Pt of the air flow.

According to the invention, a device 25 for checking the probe 10 is placed in the vicinity of the end 21 of the tube 14. The checking device 25 comprises an acoustic transmitter 26 and an acoustic receiver 27. The transmitter 26 is intended to transmit an acoustic signal that propagates inside the tube 14. The receiver 27 is intended to pick up an acoustic signal in the tube 14. The signal picked up by the receiver 27 is called the observed acoustic signal. Advantageously, the transmitter 26 and the receiver 27 may be made as one element, for example a piezoelectric element. The inside of the tube 14 between these two ends 21 and 22, the drain hole 23 and the channel 24 form an internal volume of the probe 10. The transmitter 26 and the receiver 27 are connected to the internal volume so that the transmitted acoustic signal propagates in the internal volume and so that the receiver 27 picks up the observed acoustic signal in the internal volume.

The geometric shape of the internal volume and the various connections of this volume to the other parts of the pneumatic circuit affect the observed acoustic signal in the volume. The observed signal received by the receiver 27 therefore depends on any particles lying within the internal volume and notably when the drain hole 23 is obstructed. It is possible to define a reference signal that the receiver 27 receives when the internal volume is free of any particles. The checking device 25 also includes means 28 for comparing the reference signal with the observed signal when the probe is being analysed during a test. This reference signal may be defined on a new probe 10 or after a thorough visual check of a probe 10. If the device is used for a probe 10 mounted on an aircraft, the reference signal may depend on the aircraft itself and in particular on that part of the pneumatic circuit not belonging to the probe 10.

A difference between the observed signal and the reference signal indicates the presence of particles in the internal volume. Should particles be detected, a maintenance operation has to be carried out on the probe 10 in order to remove these particles. Otherwise, if the difference is not significant, the probe 10 is considered to be operational. Such a check is very quick to carry out. This check may be carried out directly on the aircraft without removing the probe 10. This check may also be carried out during a maintenance operation on the probe 10 so as to verify that the particles, notably those able to obstruct the drain hole 23, have indeed been removed.

Advantageously, the checking device 25 comprises information means if a difference between the observed signal and the reference signal exceeds a predefined threshold. The predefined threshold may be stored in a memory of the checking device 25. The threshold may be defined by means of trials, in which different sizes of particles inserted into the internal volume, at different locations therein, are tested. The information means may be formed by a warning lamp 29 that an operator can observe during a checking operation. The information means may also be relayed by means of a connector 30 of the device 25.

During a checking operation by means of the device 25, it is possible for example to look for a resonant frequency of the internal volume. This frequency depends on any obstruction of the drain hole 23 or the presence of particles in the internal volume. Advantageously, the acoustic signal transmitted by the transmitter 26 may be the acoustic signal obtained by scanning a given frequency band. The acoustic signal observed by the receiver 27 is compared over the frequency band with a reference spectrum. The frequency band may cover extended acoustic frequencies matched to the type of probe and more generally to the complete pneumatic circuit.

Figure 3:
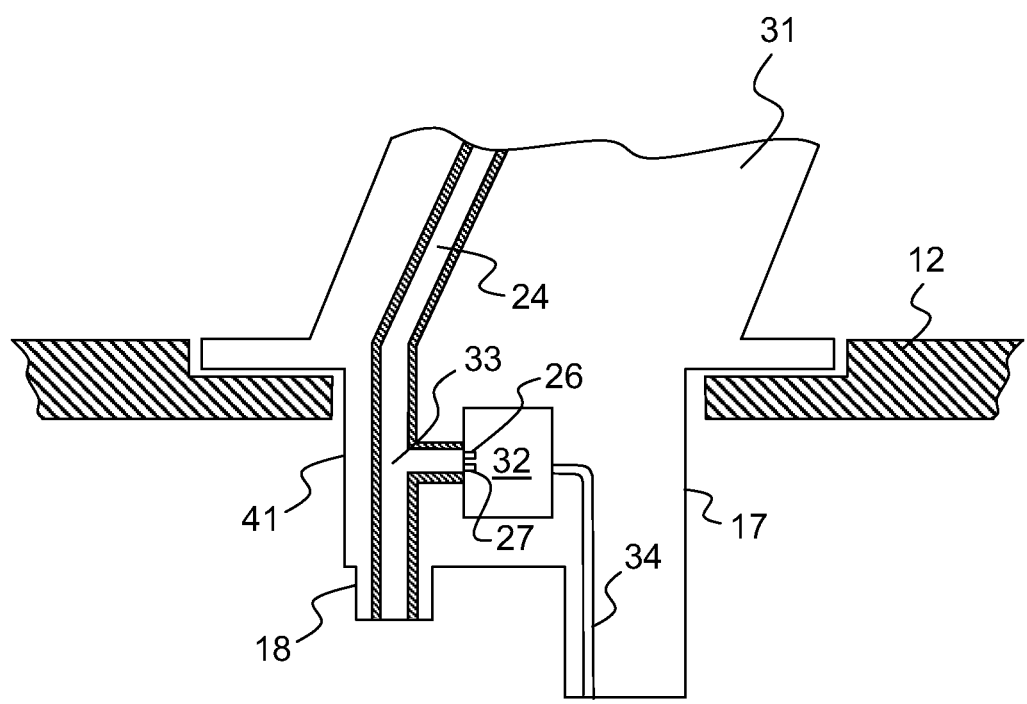
FIG. 3 shows a partial view of a total pressure measurement probe in which a checking device according to the invention is integrated.

FIG. 3 shows a partial view of a total pressure measurement probe 31 in which a checking device 32 according to the invention is integrated. The device 32 comprises, like the device 25, a transmitter 26 and a receiver 27. The probe comprises the device 32 which is connected to the channel 24, for example by means of a T connection 33 located between the Pitot tube 14 and the pneumatic connector 18. In other words, the device 32 is connected to the channel 24 between the pressure tap 40 and the pressure sensor. The device 32 is placed inside a body 41 of the probe. By connecting the device 32 to the channel 24 it is possible for the transmitter 26 and the receiver 27 to communicate with the channel 24 and therefore with the entire internal volume of the probe 31. The acoustic signal propagates in the channel 24 and in the Pitot tube 14. Any obstruction of the drain hole 23 alters the acoustic signal. The device 32 may include comparison means 28. These means may also be placed away from the probe 31. This may be achieved through the electrical connector 17 by means of a link 34. In the case of the probe 31, the information means are advantageously placed in the cockpit of the aircraft equipped with the probe 31.

The invention claimed is:

1. A device for checking a flow pressure measurement probe, the probe having an internal volume and at least one orifice for communication with an outside of the volume, comprising:
    an acoustic transmitter and an acoustic receiver configured to be connected to the internal volume so that the transmitter transmits an acoustic signal that propagates in the internal volume and so that the receiver picks up an acoustic signal observed in the internal volume; and
    means for comparing the acoustic signal observed in the internal volume with a reference acoustic signal,
    wherein the at least one orifice for communication is an inlet orifice defining an opening between the internal volume and the outside of the volume, and
    wherein the connection of the acoustic transmitter and the acoustic receiver to the internal volume is made temporarily at the opening of the at least one orifice for communication.

2. The device according to claim 1, further comprising information means if a difference between the observed acoustic signal and the reference signal exceeds a predefined threshold.

3. The device according to claim 1, wherein the transmitted acoustic signal scans a given frequency band and wherein the observed acoustic signal is compared over the frequency band with a reference spectrum.

4. The device according to claim 1, wherein the device is intended for checking a total pressure probe, a static pressure probe, a pitot-static probe or a completely or partially pneumatic angle-of-attack probe.

5. The device according to claim 1, wherein the device is configured to be connected to the internal volume in the vicinity of the inlet orifice for an airstream flowing into the probe.

6. The device according to claim 1, the acoustic transmitter and the acoustic receiver being disposed in a protrusion that is inserted into the at least one orifice for communication for connection with the internal volume.

7. The device according to claim 1, wherein the acoustic transmitter and the acoustic receiver are located on one piezoelectric element.

8. The device according to claim 1, further comprising a connector located on a side opposite of the protrusion including the acoustic transmitter and the acoustic receiver.

9. The device according to claim 1, further comprising a warning lamp located on an end opposite of the protrusion including the acoustic transmitter and the acoustic receiver.

10. The device according to claim 1, wherein the connection of the acoustic transmitter and the acoustic receiver to the internal volume at least partially blocks the flow pressure measurement probe to prevent pressure measurement.

* * * * *